R. BETTERMANN.
TRUCK FOR AUTOMOBILE BODIES.
APPLICATION FILED MAR. 28, 1911.
1,029,843.
Patented June 18, 1912.
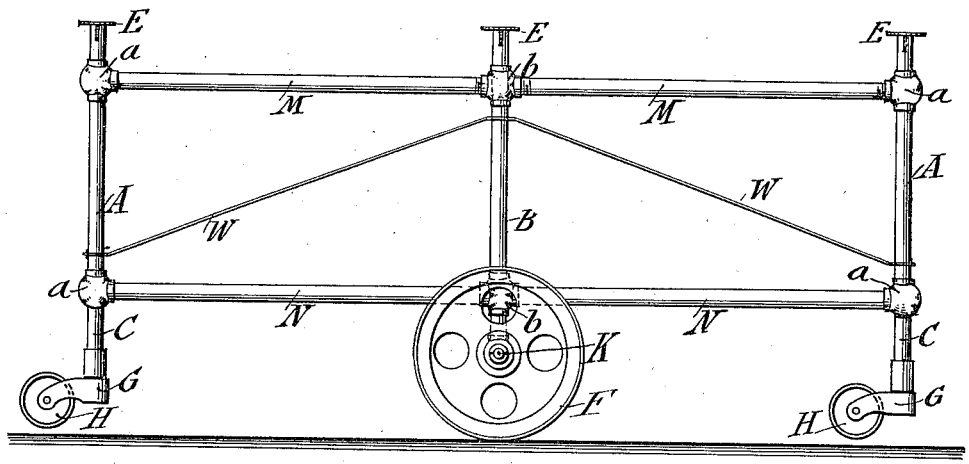
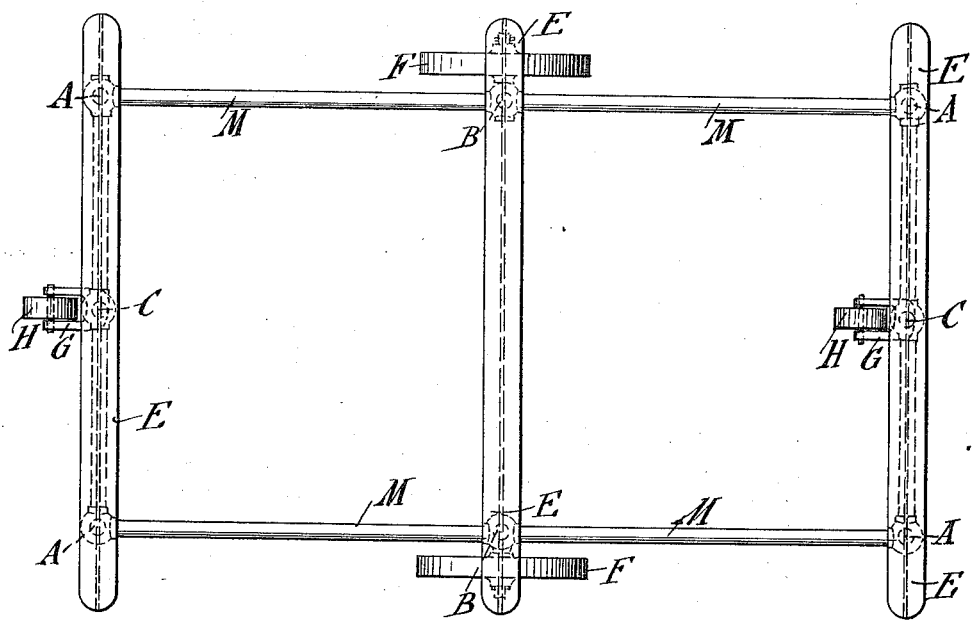

UNITED STATES PATENT OFFICE.

REINHOLD BETTERMANN, OF JOHNSTOWN, PENNSYLVANIA.

TRUCK FOR AUTOMOBILE-BODIES.

1,029,843.  Specification of Letters Patent.  Patented June 18, 1912.

Application filed March 28, 1911. Serial No. 617,371.

*To all whom it may concern:*

Be it known that I, REINHOLD BETTERMANN, a citizen of the United States of America, residing in Johnstown, in the county of Cambria and State of Pennsylvania, have invented certain new and useful Improvements in Trucks for Automobile-Bodies, of which the following is a specification.

This invention relates to an improved truck for supporting and moving automobile-bodies in factories and repair shops.

With the development of the automobile industry as well as in repairing these motor-driven vehicles, a variety of new devices were required for facilitating the manufacturing and repairing of automobiles and to lessen the expense in the handling of the various parts of the same. In many cases the body of the automobile has to be lifted off from the running gear of the machine in order to give access to the parts covered by the same; when there are no overhead cranes to facilitate the removing of the body, it requires frequently a considerable number of men for unloading the body, carrying it out of the way, and returning it again into position when the running gear is ready for replacing it thereon.

The object of this invention is to furnish for automobile factories and repair-shops an improved truck for supporting and moving the automobile-bodies before placing them again on the chassis and running gear; and for this purpose the invention consists of the body-truck for automobile-bodies, the construction of which will be fully described hereinafter and finally pointed out in the claim.

In the accompanying drawings, Figure 1 represents a side-elevation of my improved truck for automobile-bodies and, Fig. 2 is a plan-view of the same.

Similar letters of reference indicate corresponding parts throughout the several figures of the drawing.

Referring to the drawing, N represents the lower, and M the upper horizontal frame of my improved truck for supporting automobile-bodies. Each frame is made oblong in shape and made of pipe-sections of suitable size, which are provided with right and left-hand screw-threads at their ends so as to be screwed into L's $a$ and crosses $b$ which are secured to upright corner-posts A and intermediate posts B and C located between the corner-posts. The upright posts A, B and C are extended to some extent above the upper frame M and are slitted at their upper ends for inserting the webs of transverse T-bars E. The webs of the transverse T-bars are riveted to the upper ends of the posts while the heads are arranged on a level with each other for supporting the automobile-body on the same.

The intermediate side-posts B pass through the crosses $b$ of the lower frame N. At their lower ends are bearings for the transverse axle K. The intermediate end-posts C are also made in one piece and extended through suitable crosses to a short distance from the floor, the lower ends being provided with axially-turning casters comprising arms G and caster-wheels H. The casters are located for an inch or so, more or less, above the wheels so that the latter bear the greater part of the load and permit the turning of the truck on its center, while the casters permit a slight degree of tilting of the truck when getting on or off an elevator at either end. A truss-rod W extends from the lower part of the corner-post A of one side-frame to the upper part of the intermediate side-post B and continues again to the lower part of the opposite corner-post A, as shown clearly in Fig. 1, said truss-rod serving for imparting additional strength to the vertical side-frames of the truck.

The axle K consists of a piece of round steel which is suitably recessed at the lower ends of the intermediate posts B. The wheels F are loose on the axle K. The horizontal pipes are screwed into the L's and crosses and are secured in position by rivets for preventing any loosening or detaching of the parts.

The improved truck facilitates the handling, moving and supporting of automobile-bodies after they are lifted off the chassis until the same is ready again for placing the body thereon and forms a very useful implement for automobile factories and repair shops.

Having thus described my invention, I claim as new and desire to secure by Letters Patent:

A truck for automobile-bodies, comprising two oblong horizontal frames, upright corner-posts, side-posts midway between the corner-posts and extending below the lower frame, end-posts midway between the corner-posts and extending below the lower frame, L's and crosses connecting said frames with the corner-posts and side-posts, all of said posts and the members of said horizontal frames being screwed at their ends in said L's and crosses, an axle extending transversely beneath the lower horizontal frame and secured to the lower ends of the intermediate side-posts, truck-wheels on said axle, casters at the lower ends of the end-posts, the wheels of said casters being arranged slightly above the truck-wheels, truss-rods, one at each side of the truck, connecting the lower part of the corner-posts with the upper part of the intermediate side-posts, and transverse T-bars attached to the upper ends of said corner-posts and side-posts and end-posts, said posts and the members of the frame being formed of tubing.

In testimony, that I claim the foregoing as my invention, I have signed my name in presence of two subscribing witnesses.

REINHOLD BETTERMANN.

Witnesses:
CHAS. P. NOON,
J. E. PRIEST.

Copies of this patent may be obtained for five cents each, by addressing the "Commissioner of Patents, Washington, D. C."